United States Patent
Pleschka et al.

(10) Patent No.: US 11,250,835 B2
(45) Date of Patent: Feb. 15, 2022

(54) AUDIO RESPONSE VOICE OF A VOICE CONTROL SYSTEM

(71) Applicant: VOLKSWAGEN AKTIENGESELLSCHAFT, Wolfsburg (DE)

(72) Inventors: Mark Pleschka, Berlin (DE); Spyros Kousidis, Berlin (DE); Sebastian Varges, Berlin (DE); Zeno Wolze, Berlin (DE); Kim Maurice Cedziwoda, Berlin (DE)

(73) Assignee: Volkswagen Aktiengesellschaft

( * ) Notice: Subject to any disclaimer, the term of this patent is extended or adjusted under 35 U.S.C. 154(b) by 224 days.

(21) Appl. No.: 16/471,598

(22) PCT Filed: Dec. 19, 2017

(86) PCT No.: PCT/EP2017/083675
§ 371 (c)(1),
(2) Date: Jun. 20, 2019

(87) PCT Pub. No.: WO2018/115036
PCT Pub. Date: Jun. 28, 2018

(65) Prior Publication Data
US 2020/0098349 A1 Mar. 26, 2020

(30) Foreign Application Priority Data

Dec. 22, 2016 (DE) .................... 10 2016 015 352.0
Nov. 3, 2017 (DE) .................... 10 2017 219 596.7

(51) Int. Cl.
*G10L 15/14* (2006.01)
*G10L 13/033* (2013.01)
(Continued)

(52) U.S. Cl.
CPC ............ *G10L 13/033* (2013.01); *G10L 15/14* (2013.01); *G10L 15/22* (2013.01); *G10L 2015/088* (2013.01); *G10L 2015/223* (2013.01)

(58) Field of Classification Search
CPC ....... G10L 13/033; G10L 15/14; G10L 15/22; G10L 2015/088; G10L 2015/223
(Continued)

(56) References Cited

U.S. PATENT DOCUMENTS 6,219,642 B1 4/2001 Asghar et al.
2004/0243588 A1 12/2004 Tanner et al.
(Continued)

FOREIGN PATENT DOCUMENTS

DE 102013108627 A1 4/2014
EP 1074017 A1 2/2001
WO 2006083690 A2 8/2006

OTHER PUBLICATIONS

C. R. Crowelly, M. Villanoy, M. Scheutzz and P. Schermerhornz, "Gendered voice and robot entities: Perceptions and reactions of male and female subjects," 2009 IEEE/RSJ International Conference on Intelligent Robots and Systems, St. Louis, MO, USA, 2009, pp. 3735-3741, doi: 10.1109/IROS.2009.5354204. (Year: 2009).*
(Continued)

*Primary Examiner* — Bharatkumar S Shah
(74) *Attorney, Agent, or Firm* — Barnes & Thornburg LLP

(57) ABSTRACT

A method for changing the audio response voice of a voice control system based on an activation command of a user. The method includes the user requesting the change of the activation command, the user inputting the new activation command, the gender of the new activation command being determined, setting the audio response voice in accordance with the gender in response to the gender being unambigu-
(Continued)

ously masculine or unambiguously feminine, retaining the present audio response voice in response to the gender being neither unambiguously masculine nor unambiguously feminine, and applying the new activation command.

9 Claims, 2 Drawing Sheets

(51) Int. Cl.
  *G10L 15/22* (2006.01)
  *G10L 15/08* (2006.01)
(58) Field of Classification Search
  USPC .......................................................... 704/251
  See application file for complete search history.

(56) References Cited

U.S. PATENT DOCUMENTS

| | | | |
|---|---|---|---|
| 2008/0154611 A1* | 6/2008 | Evermann | H04M 7/0036 704/275 |
| 2010/0057465 A1 | 3/2010 | Kirsch et al. | |
| 2012/0265533 A1 | 10/2012 | Honeycutt | |
| 2016/0293168 A1 | 10/2016 | Chen | |
| 2017/0169811 A1* | 6/2017 | Sabbavarapu | G06F 3/165 |
| 2018/0047386 A1* | 2/2018 | Garner | G10L 15/08 |

OTHER PUBLICATIONS

E. Kurniawati, L. Celetto, N. Capovilla and S. George, "Personalized voice command systems in multi modal user interface," 2012 IEEE International Conference on Emerging Signal Processing Applications, 2012, pp. 45-47, doi: 10.1109/ESPA.2012.6152442. (Year: 2012).*

C. R. Crowelly, M. Villanoy, M. Scheutzz and P. Schermerhomz, "Gendered voice and robot entities: Perceptions and reactions of male and female subjects," 2009 IEEE/RSJ International Conference on Intelligent Robots and Systems, St. Louis, MO, USA, 2009, pp. 3735-3741, doi: 10.1109/1 ROS.2009.5354204. (Year: 2009).*

E. Kurniawati, L. Celetto, N. Capovilla and S. George, "Personalized voice command systems in multi modal user interface," 2012 IEEE International Conference on Emerging Signal Processing Applications, 2012, pp. 45-47, doi: 10.1109/ESPA.2012.6152442. (Year: 2012) (Year: 2012).*

S. E. Bou-Ghazale and A. O. Asadi, "Hands-free voice activation of personal communication devices," 2000 IEEE International Conference on Acoustics, Speech, and Signal Processing. Proceedings (Cat. No. 00CH37100), 2000, pp. 1735-1738 vol. 3, doi: 10.1109/ICASSP.2000.862087. (Year: 2000).*

Search Report for International Patent Application No. PCT/EP2017/083675; dated Mar. 29, 2018.

* cited by examiner

AUDIO RESPONSE VOICE OF A VOICE CONTROL SYSTEM

PRIORITY CLAIM

This patent application is a U.S. National Phase of International Patent Application No. PCT/EP2017/083675, filed 19 Dec. 2017, which claims priority to German Patent Application Nos. 10 2016 015 352.0, filed 22 Dec. 2016, and 10 2017 219 596.7, filed 3 Nov. 2017, the disclosures of which are incorporated herein by reference in their entireties.

SUMMARY

Illustrative embodiments relate to a method for selecting the voice output voice of a voice control system based on an activation command and to a corresponding voice control system.

BRIEF DESCRIPTION OF THE DRAWINGS

A disclosed embodiment is explained with reference to the drawings, in which.

DETAILED DESCRIPTION

Figure 1:
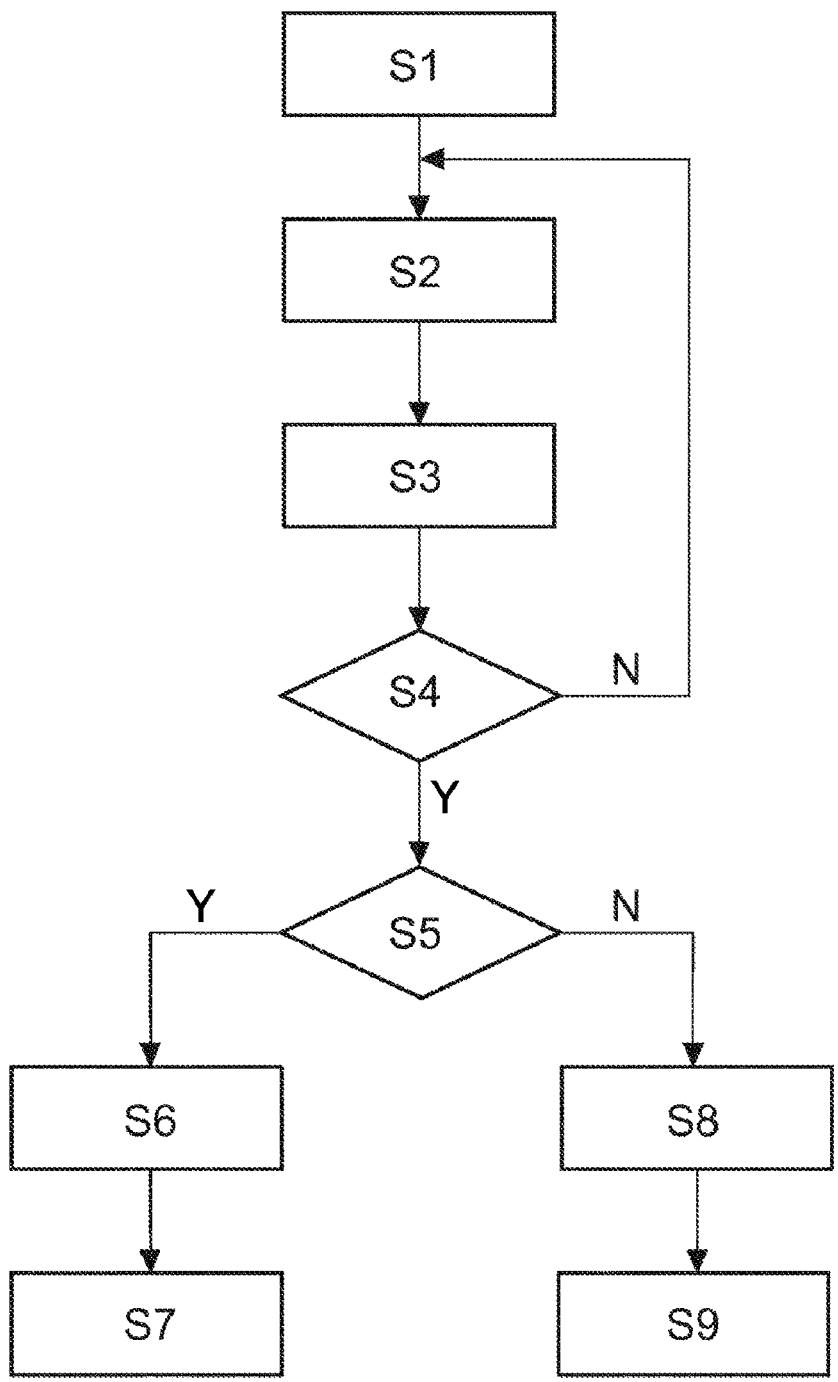
FIG. 1 shows the method for adapting the voice output in a schematic depiction.

Voice control systems for voice-controlled communication by a user with a device to be controlled that are able to be activated switchlessly by speaking an activation command, what are known as wakeup words, are known. The activation command spoken by the user, for example, the command "computer", transfers the voice control system from the idle state or standby state to the readiness state and can be selected and changed by the user himself if need be.

An activation command freely configurable by the user can therefore result in the preselected gender of the system output voice not matching the gender of the activation command, which can lead to irritations, as the following example shows:
the activation word "Alexander" yields a feminine system output voice, or
the activation word "Vanessa" yields a masculine system output voice.

If such a situation arises, that is to say the user says the command "Hello Vanessa" and the system responds with a masculine voice, the user may perceive this as an error and the system may appear "silly" as it were.

The case outlined above can be handled as follows. If the gender of the system output voice does not please the user, then the output voice can be changed manually by the user, this being able to be done in the system settings of the voice control system, for example.

However, this requires control effort for the user to match the gender of the activation command the system output voice to one another.

The document DE 10 2013 108 627 B4 describes a voice controlled communication system comprising a device having a voice input unit and voice output unit and at least one central computer unit, wherein the device has a method or mechanism for data transmission. The voice input and output unit is used to effect voice control for functions implemented on the device that are independent of the positions and/or input/output units firmly coupled to the device, wherein the voice input unit comprises a voice monitoring method or mechanism that is operable independently of the operating state of the voice input and output unit and the computer unit. When at least one predeterminable voice command is detected, the device can be activated, wherein the voice monitoring method or mechanism is connected to an energy supply of a current source that is separate from the energy supply of the communication system.

The document EP 1 074 017 B1 describes a method for providing a voice user interface having a personality, wherein the method comprises the following:
implementing a voice user interface that outputs the first voice signals, wherein the voice user interface detects voice signals, and
controlling the voice user interface to provide the voice user interface with a personality on the basis of detected voice signals.

Disclosed embodiments provide a voice control system having a system voice in which the system voice is matched to the activation command for the user in a simple manner.

Disclosed embodiments provide a method and a voice control system.

The disclosed method for changing the voice output voice of a voice control system on the basis of an activation command of a user comprises:
the user requesting the change of the activation command,
the user inputting the new activation command,
determining the word gender of the new activation command,
stipulating the voice output voice according to the word gender if the word gender of the new activation command is explicitly masculine or explicitly feminine,
retaining the previous voice output voice if the word gender of the new activation command is not explicitly masculine or not explicitly feminine, and
accepting the new activation command.

The voice output voice is therefore automatically adapted on the basis of the gender of the new activation command and the new activation command is accepted, so that adjusting the voice output voice does not force the user to go into the system settings of the voice control system.

Optionally, the new activation command is input at the request of the voice control system, wherein the activation command is input verbally by the user. A manual input is also conceivable, but this would distract a driver of a transportation vehicle, which means that the possibility is more suitable for the front seat passenger.

As a further disclosed embodiment, the request to input the new activation command is made at least twice. In this manner, detection of the activation command is improved, and it is ensured that the user also actually intends to change the voice output voice.

As a further disclosed embodiment, the word gender of the new activation command is determined on the basis of the content of a database and/or by a classifier, wherein the classifier may be rule based or statistical.

The disclosed voice control system, wherein the voice control system is configured and designed for performing the method described above, comprises:
a control device,
an activation device,
a voice input unit,
a voice output unit, and
a device for determining the word gender of an activation command.

Optionally, the word gender of the activation command is determined on the basis of the content of a database and/or by a classifier. In this case, the classifier of the device for determining the word gender may be rule based or statistical.

The voice output voice is thus adapted automatically by the system. This decreases the control effort for the user, and the risk of driver distraction is lowered in the transportation vehicle. The voice output voice is also prevented from not matching the gender of the activation command, and the system appears more intelligent as a result.

FIG. 1 shows a schematic depiction of the method for matching the voice output to a new activation command of a voice control system, wherein the communication of the method is effected at the linguistic level. It is also possible for some operations of the method to be able to be effected on the manual basis for safety.

In the first operation at S1, a user of the voice control system initiates the change of the activation command. This initiation can be effected by an appropriate manual input or by a suitable voice command to the already activated voice control system.

In the second operation at S2, the voice control system may use voice output with the current voice output setting to ask the user to input the new activation command. Following the request to input the new command in operation at S2 by the voice control system, the user inputs the new activation command into the voice control system in the third operation at S3. The input is likewise effected by the user in a verbal manner.

Operation at S3 may be of repeatable configuration. It is thus possible for the first input of the new activation command to be followed in the next operation at S4 by a test being performed to determine whether the input of the new activation command is fine and/or whether the number of inputs of the new activation command has reached a prescribed number, that is to say whether the new activation command has already been input twice, for example. If this is not the case, then the method returns to the second operation at S2 and again asks the user to input the new activation command.

If it has been established in operation at S4 that the input of the new activation command by the user met the requirements, then the method follows the Y channel to operation at S5, in which the word gender, i.e., the genus, of the new activation command is checked. If the result of the check is that the word gender of the new activation command is explicitly feminine or explicitly masculine, then the method follows the Y channel to operation at S6, in which the gender of the voice output voice is stipulated according to the ascertained word gender. At the same time, the previous activation command is replaced by the new activation command. In other words, if the genus of the activation command is feminine, then the voice control system uses a feminine voice output voice from the change onward. If, by contrast, the genus of the activation command is explicitly masculine, then a masculine voice output voice is used after the successful change.

In the subsequent operation at S7, the user is notified by the voice control system, using the newly stipulated voice output voice, that the change of activation command was successful.

If, by contrast, the result of the determination of the word gender in operation at S5 is not explicitly feminine or explicitly masculine, for example, if the word gender is a neuter or the word gender is a not explicitly detectable, then the previous voice output voice is retained in operation at S8 and the previous activation command is replaced by the new activation command.

In a subsequent operation at S9, the user is notified by the voice control system, using the previous voice output voice, that the change of activation command was successful.

Figure 2:
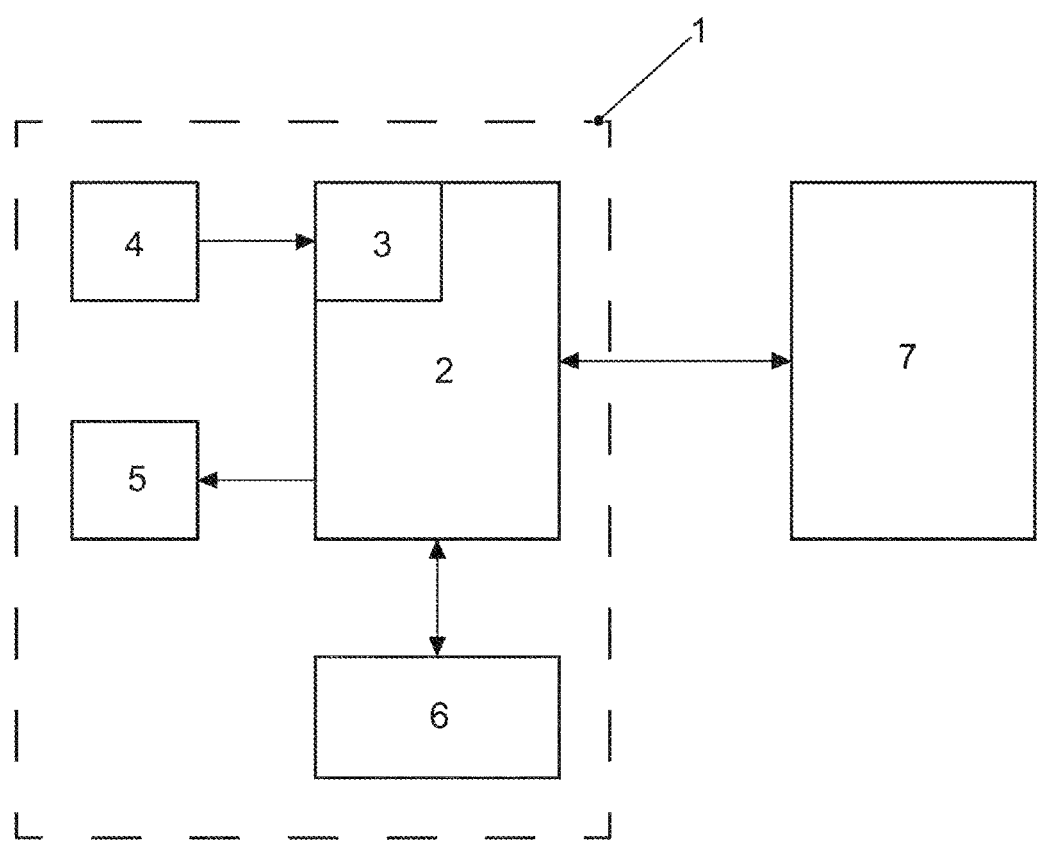
FIG. 2 shows the corresponding apparatus for performing the method.

FIG. 2 shows a schematic depiction of a disclosed embodiment of a voice control system 1 that comprises a control device 2 for controlling and processing a voice input 4 and a voice output 5. The control device 2 is used inter alia to stipulate which voice output voice the voice output 5 uses. Further, an activation device 3 is an integral part of the control device 2, wherein the activation device 3 is used to transfer the voice control system 1 from the idle state to an active state.

Further, the voice control device 1 comprises an identifier 6 for identifying the word gender of an activation command if a user intends to use a new activation command. In this case, the user can naturally also use the previous activation command if he only wishes to have the voice output changed. If, for example, the word gender of the previous activation command is feminine and the current voice output voice is masculine, then the input of the previous activation command causes a change of voice output voice.

The voice control system is thus extended by an additional component, namely the identifier 6, which, as a software component, can determine the gender of a name in the spirit of a "gender identifier". This new component, namely the identifier 6, can comprise, for example, a database with names and associated genders, and can access these, and/or can contain a rule based on statistical classifier. Further, the identifier 6 may be embedded in the infotainment system or implemented on a server. If a new activation command is selected in the voice control system 1, the system uses the interface to the "gender identifier" 6 to check the gender of the word. If an explicit association between the name and "masculine" or "feminine" has been obtained, the voice output voice is automatically changed to the appropriate gender. If there is no explicit association, the gender of the voice output voice is not changed.

LIST OF REFERENCE SIGNS

S1 Request to change the activation command
S2 The voice control system requests new activation command
S3 Input new activation command
S4 Repeat the input
S5 Check the word gender of the activation command
S6 Match the voice output to the gender ascertained in operation at S4 and stipulate the new activation command
S7 Output "change of activation command successful" using new voice output
S8 Retain the previous voice output and stipulate the new activation command
S9 Output "change of activation command successful" using previous voice output
1 Voice control system
2 Control and processing
3 Activation device
4 Voice input
5 Voice output
6 Word gender identifier
7 Device to be controlled using the voice control system

The invention claimed is:

1. A method for changing a voice output voice of a voice control system based on an activation command of a user, the method comprising:
   requesting the change of the activation command by the user, wherein the activation command comprises at least one wakeup word that transfers the voice control system from an idle or standby state to a readiness state;
   inputting the new activation command by the user;
   determining a word gender of the new activation command;
   stipulating the voice output voice of the voice control system according to the word gender in response to the word gender of the new activation command being explicitly masculine or explicitly feminine;
   retaining the previous voice output voice of the voice control system in response to the word gender of the new activation command not being explicitly masculine or not being explicitly feminine; and
   accepting the new activation command to replace the activation command, wherein the new activation command transfers the voice control system from the idle or standby state to the readiness state.

2. The method of claim 1, wherein the new activation command is input in response to a request of the voice control system.

3. The method of claim 2, wherein the request to input the new activation command is made at least twice.

4. The method of claim 1, wherein the word gender of the activation command is determined based on the content of a database and/or by a classifier.

5. The method of claim 4, wherein the classifier is rule based or statistical.

6. A voice control system, wherein the voice control system performs a method for changing the voice output voice of a voice control system based on an activation command of a user, the method comprising:
   requesting the change of the activation command by the user, wherein the activation command comprises at least one wakeup word that transfers the voice control system from an idle or standby state to a readiness state;
   inputting the new activation command by the user;
   determining a word gender of the new activation command;
   stipulating the voice output voice of the voice control system according to the word gender in response to the word gender of the new activation command being explicitly masculine or explicitly feminine;
   retaining the previous voice output of the voice control system voice in response to the word gender of the new activation command not being explicitly masculine or not being explicitly feminine; and
   accepting the new activation command to replace the activation command, wherein the new activation command transfers the voice control system from the idle or standby state to the readiness state,
   wherein the voice control system comprises:
   a control device,
   an activation device,
   a voice input unit and
   a voice output unit,
   wherein the voice control system has a device for determining the word gender of an activation command.

7. The voice control system of claim 6, wherein the device for determining the word gender determines the word gender of the activation command based on the content of a database and/or by a classifier.

8. The voice control system of claim 7, wherein the classifier of the device for determining the word gender is rule based or statistical.

9. The voice control system of claim 7, wherein the new activation command is input in response to a request of the voice control system.

* * * * *